(No Model.)

C. A. FULLER.
CAR BRAKE CLAMP.

No. 322,536. Patented July 21, 1885.

WITNESSES:
Henry Eichling
Nathan Levenson

INVENTOR
Charles A. Fuller
BY
his ATTORNEY

UNITED STATES PATENT OFFICE.

CHARLES A. FULLER, OF BOSTON, MASS., ASSIGNOR TO JOHN S. SILVER, OF NEW YORK, N. Y., AND JOHN W. MARDEN, OF MALDEN, MASS.

CAR-BRAKE CLAMP.

SPECIFICATION forming part of Letters Patent No. 322,536, dated July 21, 1885.

Application filed May 25, 1885. (No model.)

*To all whom it may concern:*

Be it known that I, CHARLES A. FULLER, of Boston, (Cambridge,) in the State of Massachusetts, am the inventor of an Improvement in Clamps for Car-Brakes for Railway-Cars, &c., of which the following is a specification, reference being had to the drawings accompanying the same, in which—

Figure 1:
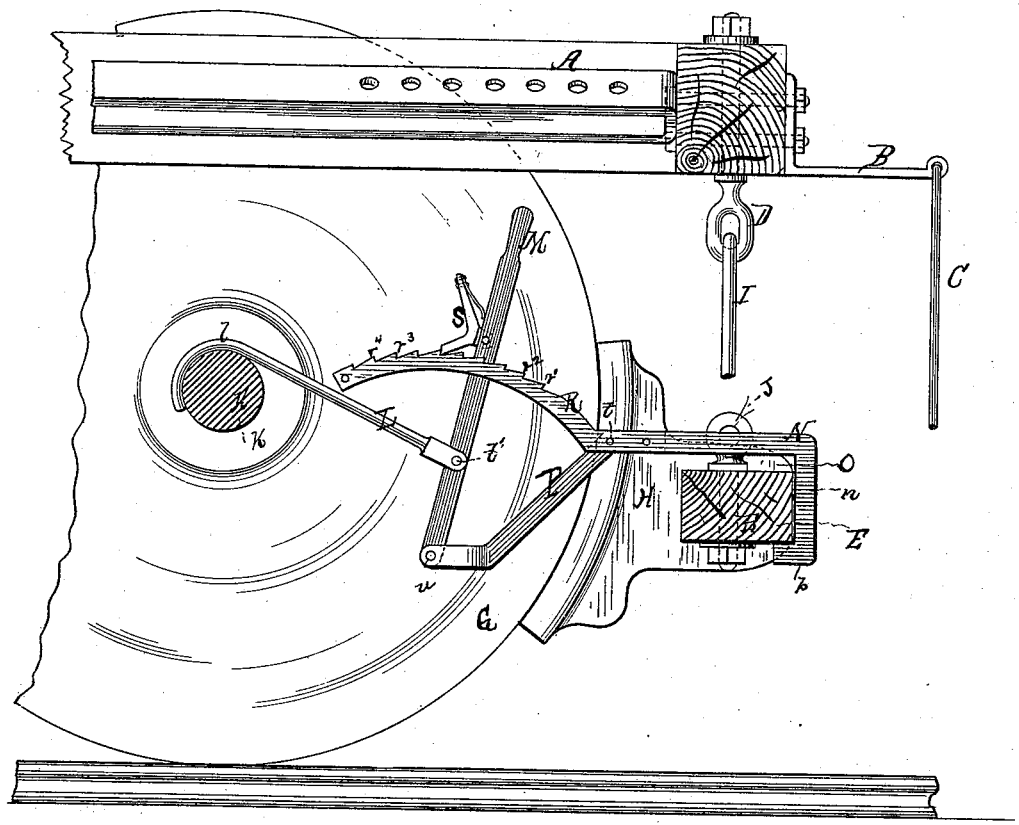
Figure 2:
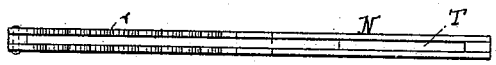

Figure 1 is a view of a car-truck, car-brake, &c., showing my invention in application; and Fig. 2 is a top view of part of my improvement, showing the slot and ratchet or serrated teeth in which the lever is operated.

My improvement consists in a clamp constructed, as hereinafter described, with dropping arm, ratchet, and lever operating in the same, and a fixed arm in which the shoe-brake of a car is located when it is desired to raise the brake in order to repair any of the connecting parts of the brake-beam, &c.

In the drawings, A is the brake-lever stop to a railroad-car; B, a parallel brake-hanger carrier, and C a parallel brake-hanger. D is a brake safety-chain eyebolt; E, the trussed brake-beam; F, a brake-shoe; G, a car-wheel; H, brake-block; I, brake safety-chain, and J the bolt passing through the trussed brake-beam.

K is the car-axle; L, a loose arm, a part of my improvement, the end curved at $l$ so as to fit over the axle and the end $l'$ hinged loosely on lever-arm M. The other arm of my clamp N extends out in opposite direction, having the recess O, formed by parts $n$ and $p$, in which the trussed brake-beam E rests. This arm N forms a part of and is tightly riveted to arm P and arm R at $t$. On arm R are formed the serrated teeth $r'$ $r^2$ $r^3$ $r^4$, &c., in which teeth the pawl S on lever M is worked. The lever M is loosely hung on end of arm P by means of rivet $u$.

The arms N and R may be made of the same piece, as shown in Fig. 2.

T is the slot formed in arm R, in which the lever-arm M is worked in its operation, and which may extend also through part or arm N.

It is desired to mend the brake safety-chain or link which is broken. The clamp is hung on the axle K by means of arm $l$, and the lever is brought back to the last notch, $r'$, on the arm R, through the slot T. The arm N is now placed around the trussed brake-beam and held there by means of arms $n$ and $p$. The lever M is now thrown forward into tooth $r^4$ and onto tooth $r^3$. The arm $l$ is brought up tight, and pulls the arm N up. By moving the lever up as far as the pawl S will engage or catch in the tooth $r^2$ or $r'$ on arm R, the shoe-brake is brought tight against the wheel and the beam E is brought up and held in position until the link I is fixed to pin J, and then the pawl of the lever M is loosed from contact with tooth. The lever is allowed to go back to its original position, and the clamp removed.

Thus it will be seen that by my improvement the various parts of a car-brake may be repaired without removing the car-truck, and in a convenient manner.

What I claim, and desire to secure by Letters Patent, is—

A brake-clamp composed of arm L, lever M, to which arm L is hinged and on which it works, arms R, N, and P, either in one or separate pieces, riveted tightly together, the lever M with its pawl working in tooth $r$ on arm R, substantially as described, and for the purpose specified.

C. A. FULLER.

Witnesses:
S. S. WILLSON,
F. M. DAGGETT.